PHYSIOLOGICAL COMMUNICATIONS SYSTEM

Filed Sept. 10, 1968 2 Sheets-Sheet 1

INVENTOR.
FRANK F. STUCKI
BY George Sullivan
Agent
Paul F. Morgan
Attorney

INVENTOR.
FRANK F. STUCKI
BY George C. Sullivan
Agent
Paul F. Morgan
Attorney

United States Patent Office 3,524,932

Patented Aug. 18, 1970

3,524,932

PHYSIOLOGICAL COMMUNICATIONS SYSTEM

Frank F. Stucki, Palo Alto, Calif., assignor to Lockheed Aircraft Corporation, Burbank, Calif.

Filed Sept. 10, 1968, Ser. No. 758,791
Int. Cl. G10l 1/08
U.S. Cl. 179—1 10 Claims

ABSTRACT OF THE DISCLOSURE

A communications system including transducers in the mouth connecting with analog-digital circuitry for accurate low noise communications without acoustic or manual components. Verbal signals are electronically transmitted by detecting the tongue-palate pressure of the speaking person at a plurality of spaced analog pressure transducers in the mouth and then converting and weighting these analog signals into a digital signal in an analog-digital converter. This digital output signal may be directly applied to a letter generator or command signal generator. Further, the letter generator may be connected to a language translator or voice synthesizer.

The present invention relates to a communications system in which verbal information is communicated non-acoustically from a plurality of tongue-palate transducers connecting with an analog-digital converter.

The transmission of speech information by conventional acoustic techniques has a number of disadvantages. Acoustical output characteristics vary considerably between individuals and voice acoustical transmission requires a large bandwidth in relation to the rate of transmission of actual information. It has been found difficult to convert acoustical speech signals accurately into digital letter form, and this difficulty has hampered efforts to successfully make direct electronic language translations. Voice acoustical transmission is subject to further information loss in high noise environments, as in aircraft, tanks, etc. The density of the gases breathed by the speaker also affects speech characteristics.

The communications system of the invention is not dependent on any acoustical signals, and will operate accurately and consistently with all normal individuals regardless of their differing acoustical characteristics or languages, and independent of environmental noise. The transmitted information may be converted into visual display or used directly for control functions.

Further objects, features and advantages of the invention pertain to the particular arrangement and structure whereby the above mentioned aspects of the invention are attained. The invention will be better understood by reference to the following description and to the drawings forming a part thereof, which are substantially to scale, wherein.

Figures 1, 2, 3:
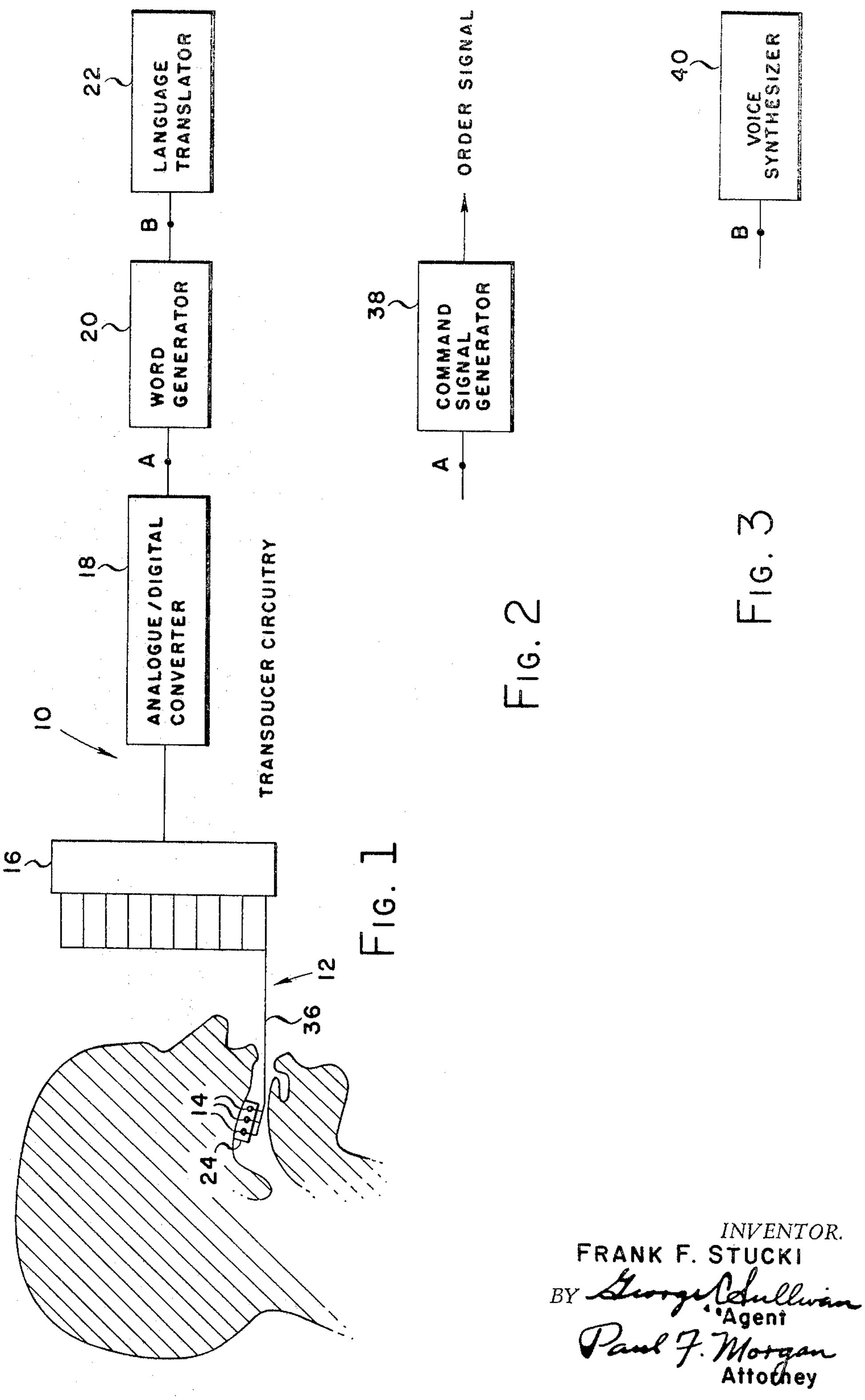
FIG. 1 is a schematic view of an exemplary communications system in accordance with the present invention.
FIG. 2 is an alternative embodiment of the communications system of FIG. 1.
FIG. 3 is a further alternative embodiment of the communications system of FIG. 1.
Figure 4:
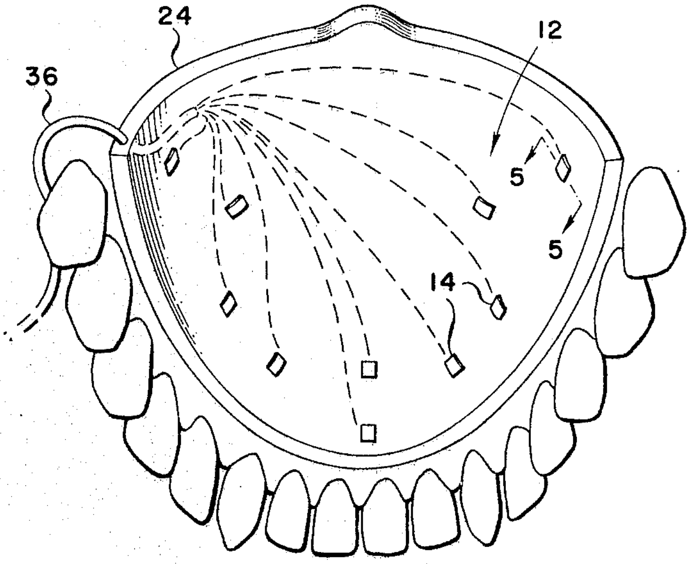
FIG. 4 shows in detail the false palate of FIG. 1 and the positions of the transducer elements thereon.
Figure 5:
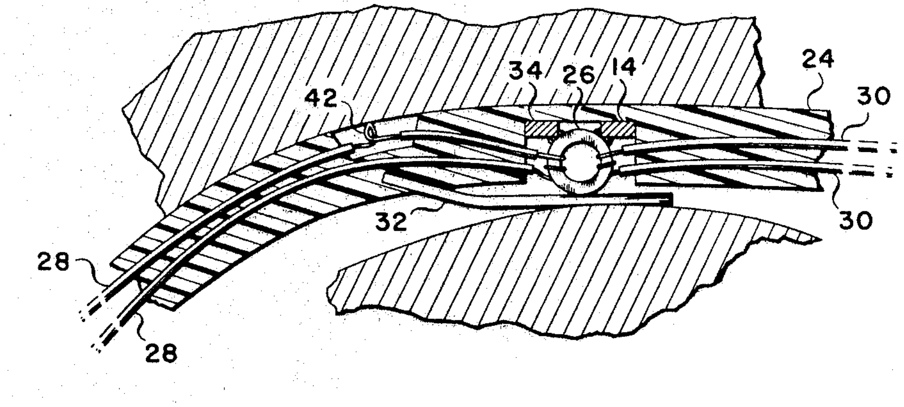
FIG. 5 is an enlarged cross-sectional view taken along the line 5—5 of FIG. 4, illustrating one of the transducer elements.

Referring first to FIGS. 1, 4 and 5, there is shown therein an exemplary communication system 10 in accordance with the present invention. The system 10 provides a method of transmitting human speech information without the inaccuracies inherent in audio techniques, yet not requiring any manual operations on the part of the individual. The system 10 of FIG. 1, as well as the systems of FIG. 2 and FIG. 3, transmits speech information by means of a plurality of transducers 12. The plurality of transducers 12 include individual pressure transducer elements 14 illustrated in detail in FIGS. 4 and 5. The pressure transducer elements 14 are spaced apart in the mouth in positions adjacent the palate and adapted to be engaged by the tongue of the individual during speech. The plurality of transducers 12 include associated transducer circuitry 16 which provides electrical analog output signals each corresponding to the pressure applied to an individual transducer element 14. These analog signals are in turn applied to the input of an analog-digital converter 18 where they are weighted and converted into a weighted digital output signal corresponding to all of the analog input signals from the plurality of transducers 12. Desired output information circuitry is then directly connected to receive this weighted digital output signal.

The word generator 20 provides a predetermined phonetic letter output signal for a given weighted digital signal from the analog-digital converter. The output of the word generator 20 may in turn be directly applied to a language transmitter 22 for direct language translation. This has heretofore been impractical due to the ambiguities and inaccuracies inherent in an acoustical system.

Previous research in speech physiology has taught that in speech, the tongue contacts the palate at specific areas and with specific pressures. The tongue contact areas have been plotted in the literature for various sounds. Other physiological investigations have attempted to measure the pressure exerted by the tongue on the palate by means of pneumatic devices or strain gauges. However, the utilization of tongue-palate contact information for other than the scientific study of the phenomena itself has not been appreciated. Further, a suitable apparatus capable of providing an accurate electrical output signal corresponding to the tongue-palate pressure in the mouth has not been previously taught, particularly an apparatus which is small and lightweight and may be carried in the mouth of an individual without interference with normal speech or other functions.

It has been found that the accurate monitoring of tongue-palate contact pressures and time durations at a plurality of contact points during speech can provide a much more accurate indication of the information being verbalized by the individual than the actual audio (acoustical) output of the individual. Acoustical speech characteristics of individuals vary widely, and furthermore, certain sounds or phonemes within a language posses acoustic features which are so similar as to be virtually indistinguishable acoustically. However, these same sounds are distinguishable from one another in the position and pressure applied by the tongue-palate in their production. The present communications system directly obtains and transforms into electrical signals the relative physiological characteristics rather than the acoustic characteristics of the speech uttered, thereby eliminating this source of information transmission error. The present system provides consistent, distinguishable, weighted digital output signals for each of the voiced expressions. These output signals are highly consistent both within the individual and between individuals and enable direct translation of the information in a word generator.

Considering first the means for converting the physiological movements directly into electrical signals, we have already seen that this is accomplished by the plurality of transducers 12. These include individual pressure transducer elements 14 mounted on a false palate 24 in the mouth and connecting transducer circuitry 16.

The precise number of transducer elements 14 and their precise position is not critical. The exemplary false palate 24 is shown in FIG. 4 with ten transducer elements 14 thereon in appropriate positions to provide the requisite information. A lesser number of transducer elements 14 may be provided, although it is believed that at least five are needed. It has been found that the contact area patterns are generally symmetrical along the center axis of the mouth and accordingly, transducers at one side of the mouth may be eliminated for persons with normal speech patterns. The selection of the palate areas in which the transducers 14 should be located is known from the art and accordingly need not be described herein. A small, movable pressure transducer may be employed as a probe for determining optimum positions for an individual if desired. Exemplary of the literature are the following articles:

Bell Telephone Laboratories Translation TR 64–17, February 1964, of Dynamic Palatography, Kuzin, Iu. I., Voprosy Psikologsi 1:137–41.

Proffit, W. R.; Palmer, J. M.; and Kydd, W. L.; Evaluation of Tongue Pressures During Speech. Folta Plolimitrica, 17, 1967, 115–128.

The construction and operation of the desired individual pressure transducer elements 14 as well as the necessary external transducer circuitry 16 therefor is taught in Pat. No. 3,307,405 issued Mar. 7, 1967, to F. F. Stucki for Ferromagnetic Pressure Transducer. (This and all other references cited herein are incorporated as part of the disclosure.) Each transducer element 14 provides, at the output of its transducer circuitry 16, an analog electrical signal with a pulse amplitude directly indicative of the pressure applied to the transducer element 14.

In FIG. 5 an individual transducer element 14 is illustrated in cross section. It may be seen that transducer element 14 includes a ferromagnetic ring or core 26. The core 26 is electrically connected by means of input leads 28 and output leads 30, each having a winding on the core 26. While the core 26 is responsive to any pressure applied thereto, its dimensions are so small as to allow a very limited area of direct contact with the tongue. Preferably, a somewhat larger tongue contacting surface is provided indirectly by a lever arm 32 or other suitable member in contact with the core 26. It may be seen that the lever arm 32 here comprises a simple strip of thin flexible sheet metal or other suitable material which is fixed at one end to the false palate 24 and cantilevers outwardly, extending over the core 26. Accordingly, any tongue pressure applied against the lower surface of the lever arm 32 is transmitted against the ferromagnetic core 26. The lever arm 32 provides a mechanical advantage in this force transmission.

The false palate 24 may be essentially similar to those used in dental plates, and may be constructed of any suitable material. It has been found that polymethyl methacrylate dental material may be used. The transducer elements 14 are preferably mounted directly into the false palate 24 at the predetermined tongue-palatal contact points. Waterproofing and protection against the corroding effects of the saliva in the mouth is preferably provided by coating the wires of the output leads 30, the input leads 28 and the transducer elements 14 with several thin layers of a suitable epoxy before these members are mounted in the false palate 24, and then coating the entire lingual surface of the false palate 24 with several thin layers of epoxy after the transducers are mounted. The superior or palatal surface of the false palate may be coated with several thin layers of silicon type coating.

To prevent the contraction and expansion or flexing of the false palate 24 material from giving spurious pressure signals to the transducer element a special mounting arrangement for the transducer element is preferably provided. In the exemplary mounting arrangement illustrated in FIG. 5 an indention slightly larger than the transducer element 14 is made in the interior surface of the false palate 24 at the desired locations. A ring 34 of steel or other rigid material is placed in the indention to provide a rigid mounting base for the ferromagnetic core 26. The ferromagnetic core 26 is then placed within the indention and may be secured by epoxy cement.

After all of the pressure transducer elements 14 have been mounted in the false palate 24 they may be directly calibrated by applying a known weight of pressure against each of the lever arms 32 and adjusting the transducer circuitry 16 accordingly.

All of the output leads 30 and input leads 28 may be combined in a miniature cable 36 which extends from the false palate 24 and conducts the leads to the external transducer circuitry 16. While the cable 36 running out of the mouth does not present any interference with normal physiological functions, if desired, a small transmitter may be employed in the mouth to transmit the data from the transducer elements without any wiring from the mouth.

Considering now the external circuitry portion of the systems of FIGS. 1, 2, and 3, it may be seen that in the alternative system of FIG. 2, a command signal generator 38 is connected at A in FIG. 1 in place of the word generator 20 and the language translator 22. The command signal generator 33 is preferably adapted to provide a given order signal output responsive to a particular weighted digital signal from the analog-digital converter; i.e., the system may be wired so that a given verbal transmission by the individual will be converted into a control signal in the command signal generator. This may provide a "no hands" control for space or other applications.

In the embodiment of FIG. 3, a voice synthesizer 40 is preferably connected to point B in FIG. 1 at the output of the word generator 20, in place of the language translator 22. It may also be placed at the output of the language translator 22.

The analog-digital converter 18, the word generator 20, the language translator 22, the command signal generator 38 and the voice synthesizer 40 may all be of conventional state of the art circuitry and accordingly need not be described in detail herein. The following references are cited and incorporated herein as exemplary of desirable circuitry which may be employed:

Aerospace Telemetry, Harry L. Stiltz, editor, Prentice-Hall, Inc., 1961

Pat. No. 2,734,182, issued Feb. 7, 1956, to J. A. Rajchman for Magnetic Matrix and Computing Devices Pat. No. 2,734,182, issued Feb. 7, 1956, to J. A. Rajchman for Magnetic Matrix and Computing Devices Pat. No. 2,843,838, issued July 15, 1958, to G. F. Abbott, Jr., for Ferromagnetic Translating Apparatus Pat. No. 2,973,506, issued Feb. 28, 1961, to N. D. Newby for Magnetic Translation Circuits Pat. No. 3,011,165, issued Nov. 28, 1961, to A. M. Angel et al. for Code Conversion System Pat. No. 3,190,963, issued June 22, 1965, to E. E. David, Jr., et al., for Transmission and Synthesis of Speech Digital Logic Handbook, Digital Equipment Corporation, Maynard, Mass., 1968 ed.

Since the rise time of the actual speech signals is at least forty milliseconds, the system will operate with only a hundred cycle bandwidth. Accordingly, it may be seen that high speed circuitry is not necessary. Magnetic core matrix systems may be readily employed for the word generator, language translator, command signal generator and voice synthesizer.

The analog-digital converter 18 accepts the multiple analog signals from the transducer circuitry 16, and applies these signals to conventional weighting circuitry, where they may be sampled at a sampling rate as high as one hundred kc. to one megacycle, for example. All of the analog (pulse amplitude) input signals are conventionally converted into a corresponding weighted digital output signal. The weighting is adjusted to allow for variance ranges between individuals, and thereby provide a standardized output signal. Exemplary suitable analog-digital converter circuitry is that shown in the Digital Logic Handbook, supra.

The word generator 20 accepts the output from the analog-digital converter 18, and converts it into the equivalent phonetic letter output which corresponds to the particular weighted digital signal from the converter 18.

Accordingly, the output of the word generator 20 is a signal in letter form corresponding to that letter being formed by the physiological movement of the tongue in the mouth of the individual. A conventional matrix generator may be employed. Suitable circuitry is illustrated, for example, in the Patents 2,734,182, 2,843,838, 2,973,506, and 3,011,165, supra. The same type of magnetic matrix or code conversion systems employed for the word generator 20 may be employed with different addressing for the command signal generator 38.

Suitable circuitry for the language translator 22 and/or the voice synthesizer 40 has been developed in the art for previously attempted acoustical systems. Exemplary is the Pat. No. 3,190,963.

Considering now a further aspect of the communications system which may be provided, it has been shown that the above-described circuitry may be operated in a reverse manner, i.e., for the reception of information. Referring to FIG. 5, it may be seen that a metal electrode 42 has been provided in the upper or palate engaging surface of the false palate 24 adjacent each of the pressure transducer elements 14. Each of the electrodes 42 is here provided simply by a polished bare loop of one of the input leads 28. It is appreciated that any suitable palate engaging electrode may be utilized, although the electrode should be sufficiently small or sharp to effect a substantially point discharge into a small defined area of the palate.

A suitable electrical current pulse is applied through the leads 28 to selected electrodes 42 to provide a stimulus to the localized nerve endings at the area of the selected electrode 42. This causes the tongue to move itself against the palate at the various positions which are stimulated. The tongue pressure is responsive to the amplitude of the signal applied, i.e., there is an application of greater pressure in those palate areas having the greater electrical discharge. Thus, the tongue moves and presses against the palate to follow along with the input information. Accordingly, the tongue is caused to move in a manner corresponding to the physiological movements which would be employed if the individual were speaking. It may be seen that the input stimulus signal for receiving corresponds to the transmitted signal from the pressure transducer elements for the same verbal information. The individual may be taught to convert the input stimulus into mentally recognizable speech information.

It may be seen that there has been described herein a novel and improved communication system. While the description herein is presently considered to be preferred, it is contemplated that further modifications and improvements within the purview of those skilled in the art may be made herein. The following claims are intended to cover all such variations and modifications as fall within the true spirit and scope of the invention.

What is claimed is:

1. A communications system comprising: a plurality of pressure transducer means;

palate mounting means for mounting said plurality of transducer means in a mouth in spaced tongue engageable positions adjacent the palate;

each of said transducer means being adapted to provide an electrical analog output signal corresponding to the pressure exerted by a limited area of the tongue against said transducer means;

analog-digital converter means electrically connecting with each of said transducer means and providing weighted digital output signals corresponding to said electrical analog output signals from said plurality of transducer means; and output information circuit means connected to the output of said analog-digital converter means providing predetermined output signals in response to weighted digital output signals from said analog-digital converter means.

2. The communications system of claim 1 wherein said output circuit information means comprises a command signal generator comparator circuit which provides a predetermined order signal output in response to specific weighted digital output signals from said analog-digital converter means.

3. The communications system of claim 1 wherein said output information circuit means comprises a letter generator.

4. The communications system of claim 3 further including a language translation circuit connected to the output of said letter generator.

5. The communications system of claim 3 further including a voice synthesizer connected to the output of said letter generator.

6. The communications system of claim 1 wherein each of said electrical pressure transducer means includes a ferromagnetic pressure transducer element mounted in said palate mounting means and a movable tongue contacting member engaging said ferromagnetic pressure transducer element.

7. The communications system of claim 6 wherein said tongue contacting member comprises a lever arm secured to said palate mounting means and extending over said ferromagnetic pressure transducer element to provide a mechanical advantage between the tongue pressure applied to said lever arm and the corresponding pressure applied by said lever arm to said ferromagnetic pressure transducer element.

8. A communications system comprising: a plurality of electrical transducer means;

palate mounting means for mounting said plurality of transducer means in a mouth in spaced positions adjacent the palate;

analog-digital converter means connecting with each of said transducer means for translating between analog signal levels at said plurality of transducer means and a corresponding weighted digital signal; and information circuit means connected with said analog-digital converter means for translating between an information signal and said weighted digital signal.

9. The communications system of claim 8 wherein each said transducer means includes an electrode means for selectively discharging into the palate at spaced positions to stimulate localized nerve endings analog electrical signals said analog-digital converter.

10. The communications system of claim 8 wherein each said transducer means includes a ferromagnetic pressure sensing element.

References Cited

UNITED STATES PATENTS

| | | | |
|---|---|---|---|
| 3,190,963 | 6/1965 | David et al. | 179—1 |
| 3,307,405 | 3/1967 | Stucki | 73—398 |

KATHLEEN H. CLAFFY, Primary Examiner

D. W. OLMS, Assistant Examiner